Sept. 19, 1944.	O. S. CARLISS	2,358,770
LOAD WEIGHING LIFT TRUCK
Filed Feb. 8, 1940	4 Sheets-Sheet 1
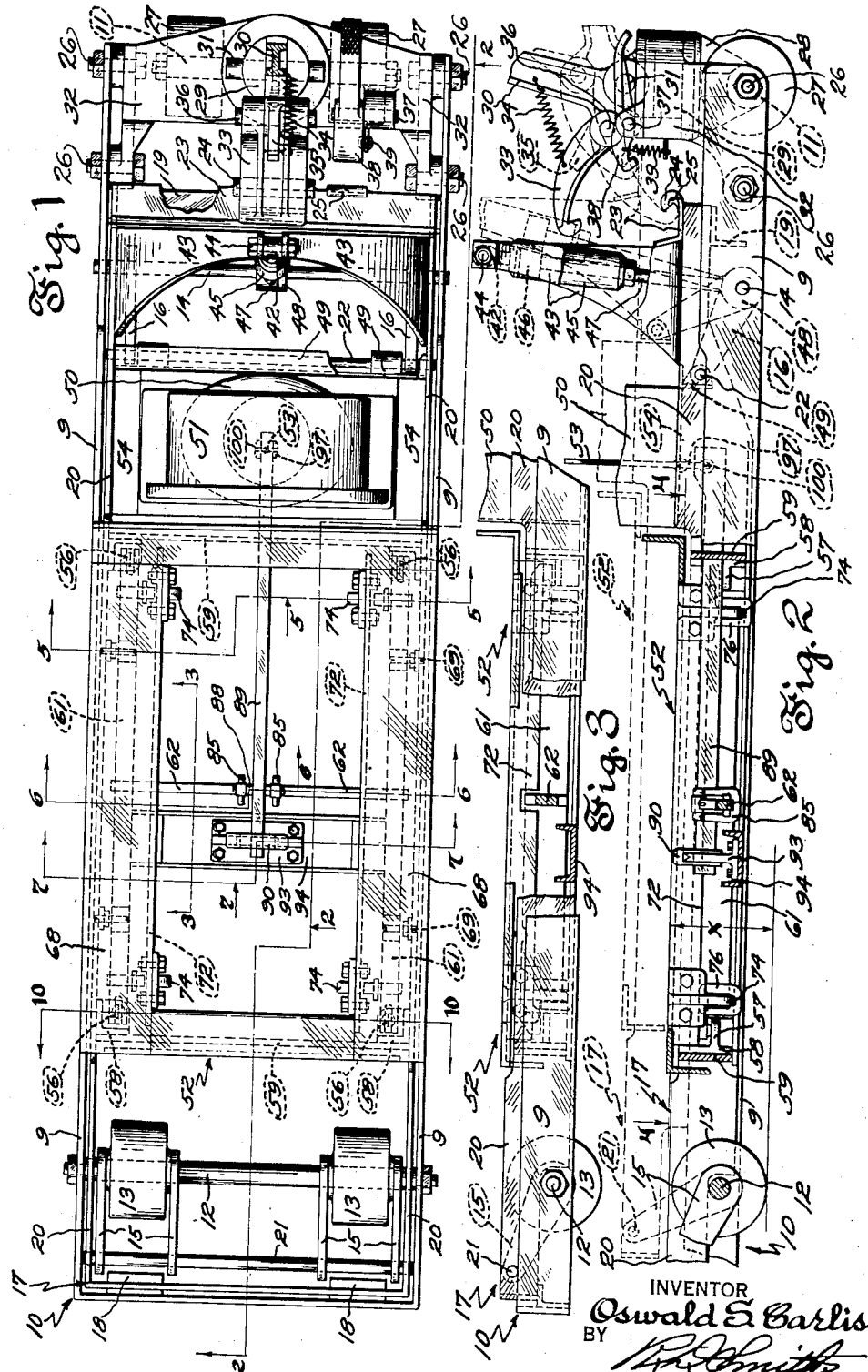
INVENTOR
Oswald S. Carliss,
BY
ATTORNEY

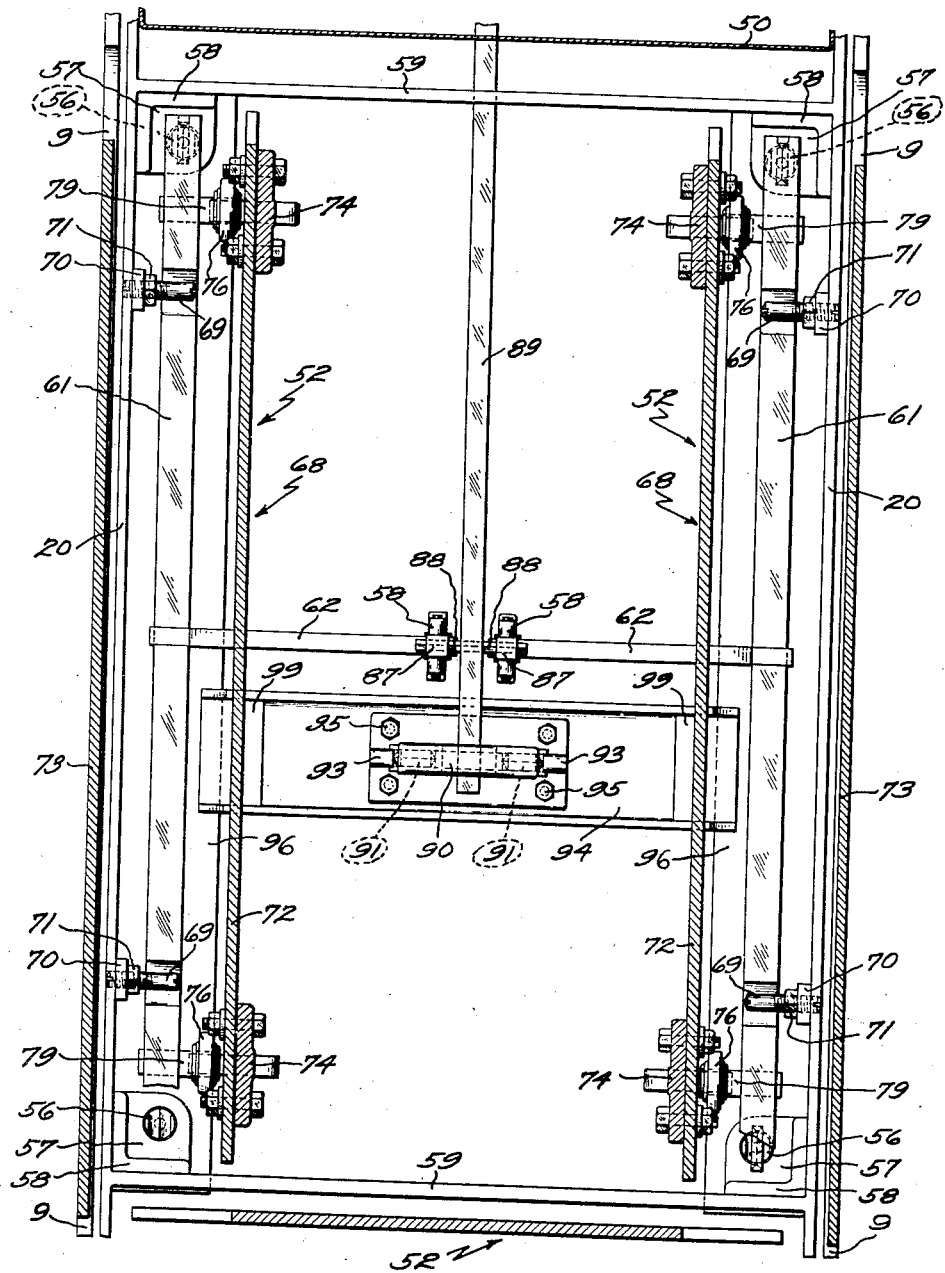

Sept. 19, 1944.   O. S. CARLISS   2,358,770
LOAD WEIGHING LIFT TRUCK
Filed Feb. 8, 1940   4 Sheets-Sheet 3

INVENTOR
Oswald S. Carliss,
BY
ATTORNEY

Sept. 19, 1944.   O. S. CARLISS   2,358,770
LOAD WEIGHING LIFT TRUCK
Filed Feb. 8, 1940   4 Sheets-Sheet 4
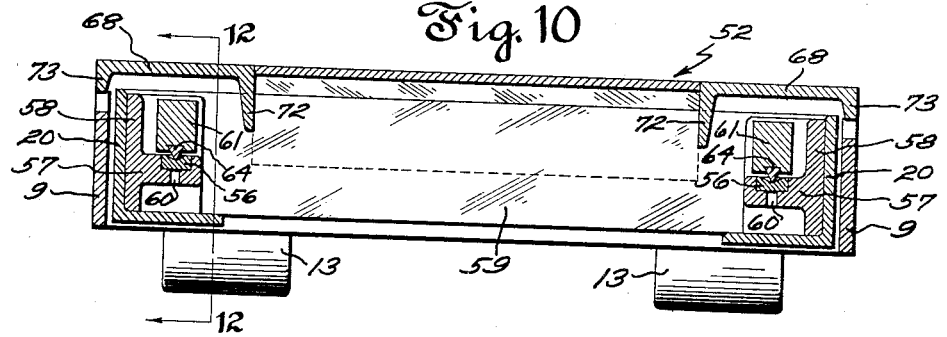
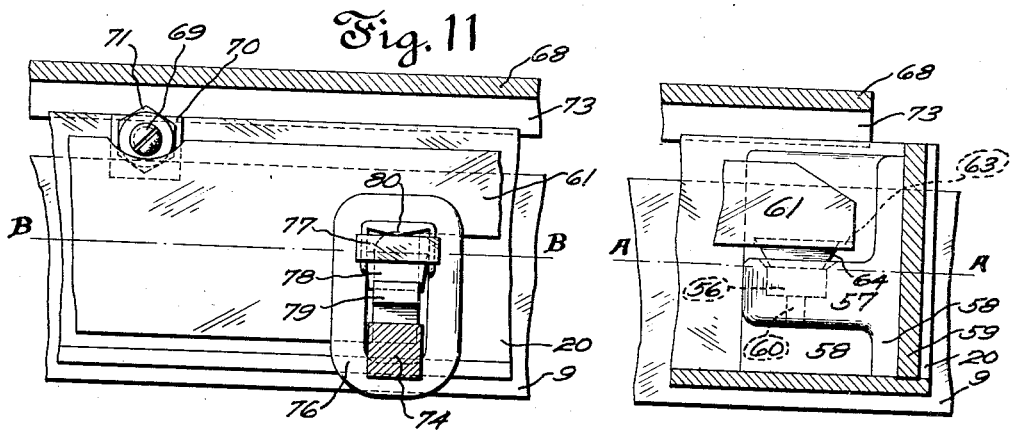
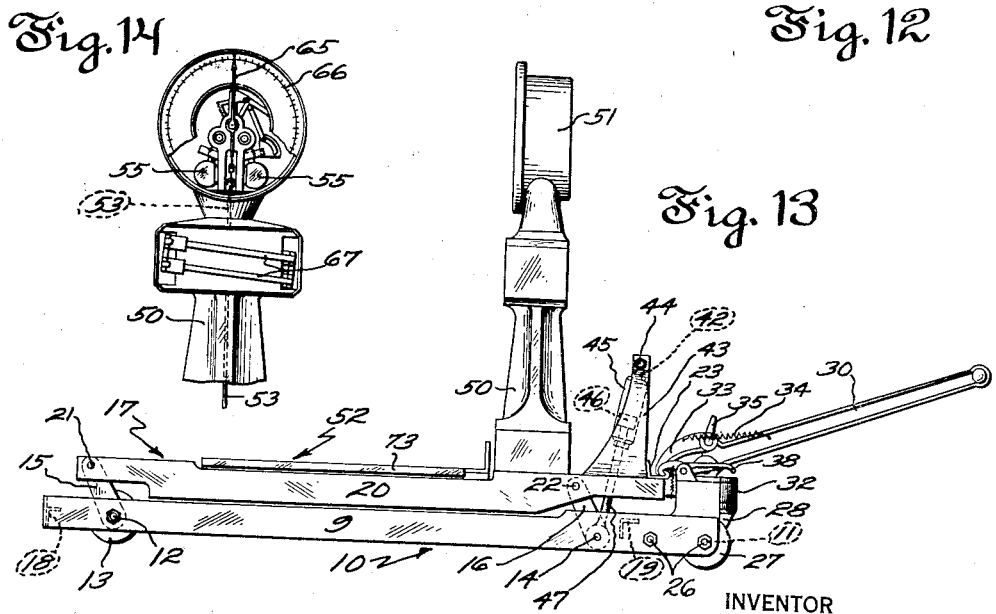
INVENTOR
Oswald S. Carliss,
BY
ATTORNEY Patented Sept. 19, 1944

2,358,770

UNITED STATES PATENT OFFICE 2,358,770

LOAD WEIGHING LIFT TRUCK

Oswald S. Carliss, Fairfield, Conn., assignor, by mesne assignments, to The Yale & Towne Manufacturing Company, Stamford, Conn., a corporation of Connecticut Application February 8, 1940, Serial No. 317,848

11 Claims. (Cl. 265—71)

This invention relates to load weighing trucks and particularly to lift trucks incorporating a weighing scale of the type having a weighing platform supported by and over a lever system carried by the raisable chassis of the lift truck. The invention also relates to improvements in the organization of such lever systems.

Prior to the present improvements the building into lift trucks of platform supporting lever systems, which transmit the weight of a truck carried load to a truck carried load-counter-balancing and weight-indicating mechanism, has required the sacrifice of features both of structure and function which are important to the satisfactory operation of lever systems for this purpose. These features have commonly been dispensed with in order to make room for closely neighboring conventional mechanisms formerly considered necessary for actuating and controlling the raisable chassis of the lift truck in its load elevating and lowering movements.

One object of this invention is to organize and operatively arrange the necessary working parts of a load weighing lift truck so that space is made available within the requisite shallow limits of the raisable chassis of the lift truck to accommodate the supporting lever system of a free-floating type of platform by which is meant a lever system so constructed that none of the lateral motion of the platform is transmitted to the levers of the system and further so constructed that all of the levers swing about fulcrums which are fixed in relation to the liftable truck chassis.

Another object is to provide a load weighing lift truck with a weighing platform of the free-floating type in whose supporting lever system no swinging motion of the platform is transmitted to the levers of the system but is, instead, absorbed by idle movement performed by the means which support the platform in a way entirely to avoid sliding or rubbing of one movement transmitting element against another, or against any other part in the lever system. This preserves under all conditions the sensitivity necessary to accurate weighing performance of the truck carried scale.

Another object is to equip a lift truck with a raisable lever system for supporting the weighing platform in which system no shaking of the parts of the lever system by movement of the truck, and no side sway of the platform when the truck is picking up or discharging its load, can result in pivot or bearing wear. This greatly enhances pivot and bearing life and reduces maintenance cost.

Another object is to equip a lift truck with a raisable lever system capable of supporting its weighing platform so that there is no binding nor friction and so that the same weight indication for a given load will result from placing such load at any one of the extreme four corners of the platform that results from placing such load at or near the center of the platform.

A particular object is the saving of an important amount of the vertical space which heretofore has been considered necessary to accommodate the working movement of an improved lever system of the type above described. This affords a more shallow raisable chassis in a lift truck and hence makes possible a lift truck having a desirably smaller overall height from floor to weighing platform. Lowness of platform in load weighing lift trucks has the double advantage of admitting the truck to more shallow spaces under a load to be picked up, as well as requiring a smaller distance of lifting of a load from the floor for transferring it to the weighing platform.

A still further object of the invention is to remove the shock absorber usually employed for checking the chassis fall, from its customary location under the raisable chassis of the truck to a different location and disposition on the truck thereby affording more room for the working parts of my improved platform supporting lever system.

Means for gaining the foregoing and other objects of these improvements are explained in the following description in which reference is had to the accompanying drawings, wherein:

Throughout the drawings sectional views are assumed to show the parts as observed when looking in the direction of the arrows applied to the lines which designate the various section planes.

Fig. 1 is a plan view of a load weighing lift truck embodying the present improvements.

Fig. 2 is a side view of the lower portions of the lift truck taken partly in section on the planes 2—2—2 in Fig. 1, with the liftable chassis in lowered position.

Fig. 3 is a fragmentary side view corresponding to Fig. 2 but showing certain parts under the weighing platform taken in section on plane 3—3 in Fig. 1.

Fig. 4 is an enlarged plan view of the parts of the lever system which lie under the weighing platform and is taken in section on the plane 4—4 in Fig. 2.

Fig. 10 is a view drawn on a scale similar to Figs. 4 to 7 taken in section crosswise of the lift truck on the plane 10—10 in Fig. 1.

Fig. 11 is a fragmentary view drawn on the same enlarged scale as Figs. 8 and 9 taken in action on the planes 11—11—11 in Fig. 5.

Fig. 12 is a fragmentary view drawn on a correspondingly enlarged scale taken in section on the plane 12—12 in Fig. 10.

Fig. 13 shows a side view of the complete lift truck and its load weighing apparatus drawn in considerably reduced size, the liftable chassis of the truck being locked in raised position.

Fig. 14 is a fragmentary view of the face of the weighing scale looking toward the right at Fig. 13.

Figure 5:
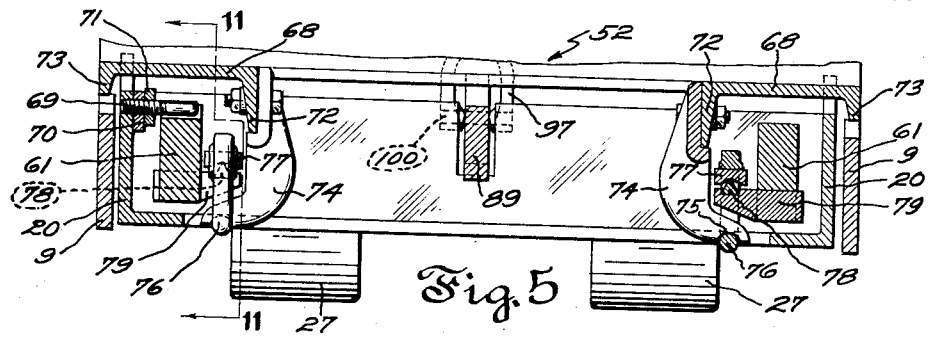
Fig. 5 is a view drawn on the same scale as Fig. 4 taken in section crosswise the lift truck on the planes 5—5—5 in Fig. 1.

The low-lying main body frame of the truck appears at 10 and may comprise a skeletonized rectangular rigid structure whose spaced horizontally extending opposite side irons 9 support the ends of the crosswise extending rear dead axle 12 on which the two rear traction wheels 13 of the truck are freely rotatable. A cross rod 14 also spans the width of body frame 10 nearer the front of the truck and has its ends anchored in side irons 9. Pivoted on the rear axle 12 are four swingable lift guide links 15 and pivoted on cross rod 14 are two corresponding lift guide links 16, preferably of the same effective length as links 15. The opposite ends of links 15 and 16 serve to support the raisable chassis 17 of the lift truck and all of its carried parts when this chassis is in elevated position.

Links 15 further maintain chassis 17 horizontal by keeping side irons 20 parallel with side irons 9 at all times. When chassis 17 is in lowered position, its weight is supported by two rigid angle irons 18 fixed to and projecting forward from the rear end of the body frame 10 and by an angle cross iron 19 spanning the width of body frame 10 nearer the front end of the truck.

The liftable chassis designated as a whole by 17, is also of the nature of a skeletonized rectangular structure whose ends fall short of the full length of the main body frame 10 of the truck and whose side irons 20 fall just inside the side irons 9 of the body frame in nested relation to and flanking the latter when chassis 17 is in fully lowered position. Spanning the width of and carried in the liftable chassis near its rear end is a cross rod 21 with which the upper ends of links 15 pivotally engage. Correspondingly spanning the width of and carried in the liftable chassis near its front end is a similar cross rod 22 with which the upper ends of links 16 pivotally engage. Further spanning the width of the liftable chassis at its extreme front end is a catch plate 23 which carries at its forward edge a lift hook 24 and beside it a smaller lock hook 25. These hooks in structure and function correspond respectively to similar hooks numbered 35 and 36, respectively, in United States Patent No. 1,257,650 granted to William Stuebing, Jr. Further corresponding to the construction shown in said patent there may be employed the following conventional parts for elevating the liftable chassis of the truck, for locking it for an indefinite time in elevated position, and for releasing it to permit its automatically retarded drop to lowermost position, all by the actuation of simple mechanical controls which here will be described but briefly as will also the caster-like mounting of the front wheels of the truck since the said patent to Stuebing fully discloses a sufficient example of conventional practice.

The handle 30 by which the truck may be impelled and maneuvered for wheeling it into designed relation to a load to be weighed, and when desired for conveying loads, is pivoted at 31 to the top end of the upward extended shank or gudgeon 29 of a heavy duty forked caster frame 28 which is journaled in a central vertical bore in a cross head 32 which extends crosswise between and is made rigid with the front end of the body frame side irons 9 by bolts 26. The forks of caster frame 28 afford horizontally swingable bearings for the front axle shaft 11 of the truck on which the two front traction wheels 27 are retained and freely rotatable. Pivoted at 36 to the hinged end of handle 30 is a draw claw 33 urged upwardly by a spring 34 against a stop 35. Pivoted at 37 to the cross head 32 is a treadle released latch 38, urged counterclockwise in Figs. 1 and 13 by the spring 39 to a position ready to receive and interlock with the chassis carried hook 25 when the chassis is lifted to its fully elevated position shown in Fig. 13.

The liftable chassis 17 is further bridged crosswise by a raised arch-like structure composed of two standards 43 each of which is rigid with the chassis side irons. These standards are joined at their upper ends by a bolt 44 which serves as pivot pin for the upper end bearing 42 of a pneumatic cylinder 45. A plunger or piston 46 is slidable longitudinally of and within cylinder 45 serving as a dash-pot device for resisting and retarding the fall of the liftable chassis from its elevated position in Fig. 13 to its lowered position in Figs. 2 and 3. In other words, as is customary in dash-pot devices for checking mechanical movement in only one of two opposite directions, the cylinder or piston may be provided with conventional means not shown such as a suitable valve arranged to permit the free inlet of air or other fluid to the interior of the cylinder above the piston when chassis 17 is being raised, while restricting to a preferably regulatable extent the ability of the air or fluid to leave such space when the chassis is moving downward. The piston rod 47 has a bearing block 48 at its lower end which pivotally engages with the cross rod 14 whose ends as hereinbefore described are fast in the side irons 9 of frame body 10.

Further serving as a brace to increase the rigidity of the liftable chassis 17 is an angle iron 49 extending crosswise of the truck. Just at the rear of iron 49 and upstanding from a base plate 54 which bridges the chassis side irons 20, there is a hollow rectangular column 50 which by means of this base plate is made rigid with the chassis 17. The upper end of column 50 supports the housing 51 of an automatic load counter-balancing and weight-indicating mechanism. This weighing scale mechanism may be entirely conventional and of automatic or non-automatic load offsetting type.

A preferred type of automatic load-counter-balancing and weight indicating mechanism particularly adapted to withstand the extraordinary abuses to which truck carried weighing scales are subjected is shown in fuller detail in the copending application of O. S. Carliss, Serial Number 228,344, now Patent No. 2,250,294 granted July 22, 1941. Fuller details of the dial head unit therein employed are set forth in U. S. Patent No. 2,083,413, granted to G. E. Weist. In view of the fuller disclosure in said application and patent it is only necessary here to explain that the downward pull of a load force on draft rod 53 causes lifting of the load-counterbalancing pendulums 55 and causes weight indicating pointer 65 to sweep over the dial graduations 66. The tare beams 67, with or without counting pans attached thereto, are connected and operate as usual.

In the present construction there is exerted on draft rod 53 the downward pull of the weight of a load placed on the weighing platform 52. The system of levers for supporting this platform in full-floating manner embodies a number of improvements which are novel with this invention and which yield vertical compactness making possible the lowering of the top surface of the load receiving platform to a smaller distance from the floor on which the truck rolls than has heretofore been possible in load weighing lift trucks of comparably large load weighing capacity. This lever system will next be described.

Four of the five main and stationary fulcrums, as best shown in Figs. 4, 10 and 12, are afforded by cylindrical bearing blocks 56 imbedded in corner lugs 57. Thus these four fulcrums are divided into two pairs of fulcrums spaced longitudinally of the truck, the fulcrums of each such pair being located at a common side of the lift truck within the range of height levels occupied in common by the relatively nested body frame side irons 9 and chassis side irons 20 and flanked thereby. Each of lugs 57 comprises a horizontal web of a casting whose mounting flanges 58 are securely welded to one side iron 20 of the chassis 17 and to one of the cross irons 59 which span the width of the chassis at the front end and the rear end respectively of the lever system. The corner bearing blocks 56 being round may turn within their seats in lugs 57 and thus accommodate the direction of the V-grooves in their bearing surfaces to whatever direction their supported knife edge pivots assume. Blocks 56 may be removed by use of an extracting punch inserted upwardly through the aperture 60 in each lug 57.

Contrary to prior practice in load weighing lift trucks, the two rear corner bearings in my improved lever system do not contribute to the support of the same lever. Instead, each two fulcrums 56 which are located at a given side of the truck, support respectively opposite ends of the main bar 61 of a T-shaped side lever. Rigid with each bar 61 there is a tapered, inwardly directed arm 62 best shown in Figs. 4 and 6, fixedly lodged or anchored in a notch in the upper edge of the bar 61 by welding or any other suitable means. Each such side lever composed of bar 61 and the arm 62 thus in effect constitutes an integral structure, swingable on an axis extending lengthwise of the truck just inside each of the side irons 20 of the liftable chassis. The action of each T-shaped lever 61—62 is entirely independent of the other, as is therefore its ability to respond to weights of loads placed on the weighing platform 52. As best shown in Figs. 10 and 12, the under edge of each end of each bar 61 has a dove-tailed groove 63 firmly but removably holding in fixed relation to the bar a downward disposed knife edge pivot 64 of triangular cross section seated in the V-groove of some one of the four bearing blocks 56. To prevent pivots 64 from being jarred out of, or otherwise dislodged from, their V-shaped seats on bearing blocks 56, the top edge of each bar 61 has two shallow notches cut therein at points respectively near each end of the bar to afford room for a retainer stud 69 having threaded engagement with the chassis side iron 20 and with a wall thickening pad 70 welded to the inner surface of the iron. Stud 69 is provided with a screw-driver slot in each end so that it may be turned from either side of the chassis iron. A lock nut 71 serves to prevent the stud 69 from jarring loose and further adds to its rigidity as a retaining guard for the lever bar 61. As best shown in Figs. 5 and 11, enough clearance resides between stud 69 and bar 61 to permit the latter to rock operatively upon its knife edge pivots 64.

As best shown in Figs. 5 and 11, the corners of the weighing platform 52 exert independent downward pressure on the side levers 61—62 at four different points namely at two points on each side lever spaced apart lengthwise of the truck. All four points are spaced as widely from one another as is permitted by the working room under the platform. The linkage mechanisms serving to transmit the downward force of platform 52 to side levers 61—62 are constructed alike at each of the four platform corners. It will therefore suffice to describe one such mechanism in detail, particular reference being had to Figs. 5 and 11.

Weighing platform 52 is made up of an assembly of border irons which include two laterally spaced channel irons 68 running lengthwise at the sides of the lift truck, each having a relatively deep downward directed inner edge flange 72 and a relatively shallow outer edge flange 73. The vertical space between the bottom edges of the platform's outer flange 73 and the top edges of the chassis side irons 20 is sufficient to permit all of the up and down movement of the weighing platform required for weighing loads up to the full capacity of the scale. Rigidly bolted to each inner flange 72 are two downward projecting dog-leg brackets 74 each having an outward protruding bottom foot portion notched at 75 in a manner to seat pivotally down against the bottom bight of a suspension loop 76. This loop is self rigid and formed to retain rockably within its top bight an inverted bearing block 77 presenting its V-shaped seat downward for resting upon the upward presented knife edge pivot 78. This knife edge pivot is of triangular cross section and rigidly held in a dove-tail groove in a bracket 79, the latter projecting from bar 61 and being lodged fixedly, as by welding, in a notch cut in the bottom edge of bar 61.

Figure 6:
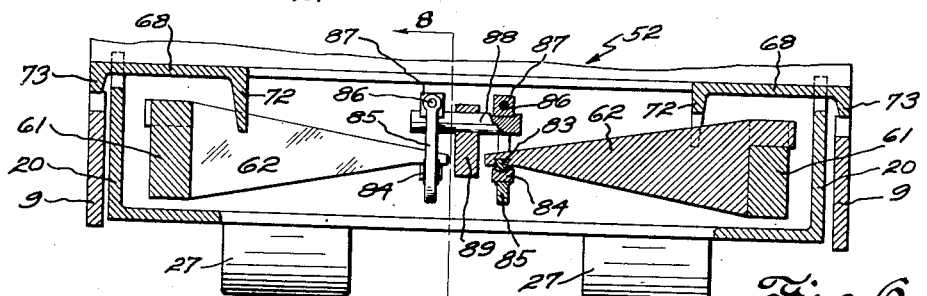
Fig. 6 is a crosswise view on a similar scale taken in section on the planes 6—6—6 in Fig. 1.
Figure 8:
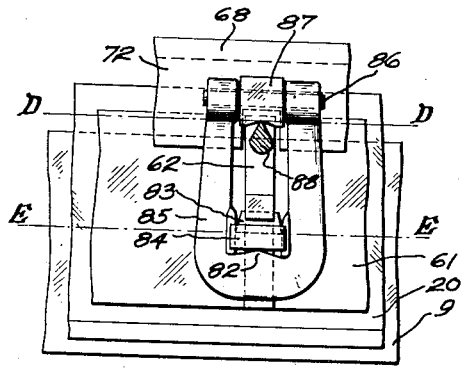
Fig. 8 is a still further enlarged fragmentary view taken on the plane 8—8 in Fig. 6.

The inner extremities of the two arms 62 of the two side levers 61—62 are provided respectively with inverted knife edge pivots 83 fixed securely but removably in dove-tail grooves as shown in Figs. 6 and 8. Each of pivots 83 rests on a different V-grooved bearing block 84 which is removably retained at the bottom of one of the two U-shaped suspension links 85 shown best in Figs. 6 and 8. Pivotally carried on a rod 86 joining the top ends of the U-shaped link 85 is a V-grooved bearing block 87. The bearing grooves in blocks 84 extend lengthwise of the truck while the bearing grooves in blocks 87 extend crosswise of the truck. Also extending crosswise of the truck is an elongated knife edge pivot 88 on each of whose ends the bearing blocks 87 respectively rest. The central portion of pivot 88 penetrates and is firmly fixed in the center lever 89 which is disposed centrally lengthwise of the lift truck.

Figure 7:
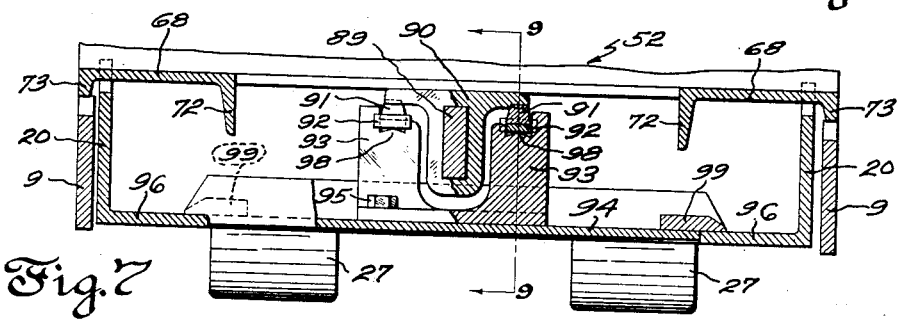
Fig. 7 is another crosswise view on a similar scale taken in section on the planes 7—7—7 in Fig. 1.
Figure 9:
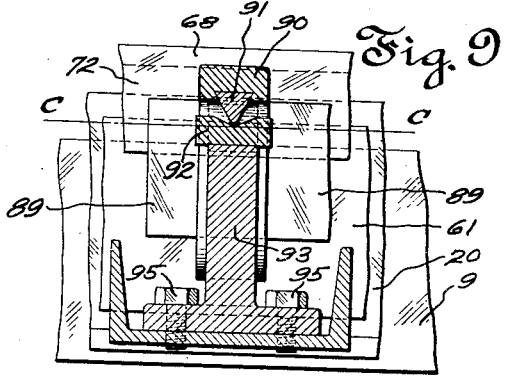
Fig. 9 is a fragmentary view drawn on the same scale as Fig. 8 taken in section on the planes 9—9—9 in Fig. 7.

As best shown in Figs. 4, 7 and 9, the rear end of center lever 89 is equipped with a T-shaped yolk 90, each of whose opposite and laterally extending top arms has a dove-tail groove in which is fixedly secured a downward disposed inverted knife edge pivot 91. These knife edge pivots 91 rest respectively on V-grooves presented upward by bearing blocks 92 carried at the top of a main fulcrum standard 93 whose base flanges are held to the supporting channel iron 94 by bolts 95. This constitutes the fifth of the five stationary fulcrums of the lever system. Channel iron 94 comprises another rigid and bracing part of the liftable chassis of the truck extending crosswise thereof and being supported by the joining of each of its ends to flange plates 96 with the aid of an overlapping splicer 99 welded in place. Plates 96 extend lengthwise of the truck at each side of the chassis from one to the other of cross bars 59, being welded or otherwise fixedly secured thereto and to the side bars 20 of the liftable chassis.

Center lever 89 extends forward from its fulcrum on standard 93 as best shown in Figs. 1 and 2 and terminates beneath the scale column 50, at which point by means of any suitable connection, such as the shackle 97, it communicates operatively with the bottom end of the draft rod 53 hereinbefore referred to which passes through an aperture in base plate 54 and extends upward through column 50 connecting with the tare beams 67 and load counterbalancing pendulums within the housing 51 as heretofore made clear.

Particular attention is called to the following among the many advantageous features of arrangement and organization of the parts which have been described. Because each bearing block 87 is free to swing on its hinge pin 86, as each bearing block 77 is free to rock against the edge of a ridge 80 formed on suspension loop 76, and as each bearing block 92 is free to rock against the edge of a ridge 98, and as each bearing block 84 is free to rock upon the edge of a ridge 82, and because these permissible swinging and rocking movements of the various bearing blocks take place in planes at right angles, respectively, to the directions in which their V-grooves extend, there is in effect, in each lever and link connection, a universal freedom of movement in directions both lengthwise of the truck and crosswise of the truck so that every knife edge pivot bearing which is utilized to transmit load weight from platform 52 to lever 89 is protected from rubbing action and undue wear consequent thereto.

It is further noted that the horizontal level indicated as A—A in Fig. 12 at which pivots 64 bear upon blocks 56 is at the same height in relation to the liftable truck chassis 17 as is the horizontal level designated B—B in Fig. 11 at which the knife edge pivots 78 contact with and receive the downward pull of blocks 77 and as is the horizontal level designated E—E in Fig. 8 at which the knife edge pivots 83 contact with and bear down on blocks 84. In like manner, the horizontal level designated C—C in Fig. 9 at which the knife edges 91 rest upon bearing blocks 92 is at the same height in relation to the liftable truck chassis as is the level D—D in Fig. 8 at which the knife edge pivots 88 meet and receive the downward pull of bearing blocks 87. It will further be understood that the point of pivotal bearing contact of the knife edge 100 fixed in the nose or front end of center lever 89 with the draft rod shackle 97 is also normally in the same horizontal plane with the common levels marked C—C and D—D. This relationship of the levels of the points at which knife edge bearing contact occurs and wherein all forces acting on the side levers 61—62 are applied thereto in a common horizontal plane, and wherein all forces acting on center lever 89 are applied thereto in a common horizontal plane, eliminates sources of error and inaccuracy of weight indication which have heretofore made it impossible for a lift truck carried scale to weigh as accurately as can a non-portable scale.

Fig. 2 makes clear the snugly nested relationship of the parts in the improved lift truck. Features highly desirable in a platform supporting lever system have been successfully combined with a relatively nested main body frame and liftable chassis in a manner to make possible a vital decrease in height from floor to weighing platform (dimension X in Fig. 2). The attainment of this result has been aided by removing the chassis fall checking mechanism, such as cylinder 45 and piston 46, from customary location horizontally disposed beneath the weighing platform or laterally at the side thereof, to the novel location and more vertical operating disposition shown in Figs. 2 and 13. The side bars 20, 20 of the liftable chassis that is on the wheeled carriage closely flank the frame bars 9, 9, respectively, of such carriage and are shaped and disposed to avoid interference with axle shaft 12 so as to permit bars 20, 20 to sink to a position very nearly as low as bars 9, 9. The system of levers supporting the weighing platform 52 is contained within a range of levels between the top edges of bars 20, 20 and the bottom edges of bars 9, 9.

The operation of the improved lift truck will for the most part be clear from the foregoing description of its construction. When not in use the parts will customarily occupy their positions shown in Fig. 2. The handle may be swung downward to its position in Fig. 13 for hauling and maneuvering the scale about without normally exerting any lifting effect upon the truck chassis 17 because draw claw 33 is normally held out of engagement with the drag hook 24 by spring 34. When the truck has been maneuvered to a position beneath some weighable load which for this purpose may constitute a bin standing on short legs, the operator will swing handle 30 to upright position and then force the draw claw 33 into catching engagement with the lift hook 24 on the raisable chassis. Handle 30 is then swung downward toward a horizontal position whereupon the pull of the draw claw swings chassis 17, as guided by its links 15, 16, upward and forward into its broken line position in Fig. 2 (full line position in Fig. 13). By this movement, platform 52 picks up the load and the weight of same is indicated by scale pointer 65. Now the treadle released latch 38 is enabled to catch and hold the locking hook 25, thus maintaining platform and load in elevated position so that the operator is free to leave handle 30 and give his attention to observing and recording the weight of the load indicated by the scale.

When the weighing operation is completed the operator will release hook 25 from latch 38 by stepping upon the treadle portion of latter, whereupon gravity restores the chassis 17 to its lowered position, its fall being governed and retarded by the yielding resistance of the dashpot cylinder and plunger 45, 46. The truck is now free to be pulled away from under the load, or at the option of the operator may be used to convey the load to a different location and finally deliver or let it down to stand in any desired location.

The performance of the parts of the lever system in this weighing of the load consists in platform 52 forcing the offset foot portions of the four dogleg brackets 74 down upon suspension loops 76, respectively, each of which loops at once pulls down upon one of the four brackets 79 projecting from bars 61 of the T-shaped side levers. This rocks the side lever at the left of the truck clockwise upon its stationary fulcrums 56 in Figs. 5, 6 and 10 and rocks the side lever at the right of the truck counterclockwise upon its stationary fulcrums 56 in said figures. Both of the side lever arms 62 consequently exert a downward force on the U-links 85, respectively, which at once pull downward jointly upon opposite ends of the knife edge pivot 88 fixed in center lever 89. The latter is thereby urged to rock clockwise upon its stationary fulcrum 92 in Fig. 2 in accurate correspondence with the weight of the load, whatever part of the whole area of platform 52 may be supporting such load. The downward pull of the extreme right (front) end of center lever 89 in Fig. 2 is imparted to the draft rod 53 of the load-counterbalancing and weight-indicating mechanism including the pendulums 55 which are thereby raised until they automatically counterbalance the load whose weight will be indicated by scale pointer 65.

While a dial type of scale is herein illustrated for performing the load off-setting and weight indicating function, other types of weighing apparatus may be substituted for the mechanism contained in the scale column 50 and housing 51. The present invention is more particularly concerned with the organization of the parts of the lever system under the weighing platform and their relationship to the lift truck structure and its load elevating and fall checking mechanisms with which the lever system is associated. Obviously the cylinder 45 may be reversed end for end so that the piston rod bearing block 48 will engage bolt 44 while the cylinder end bearing engages cross rod 14.

The foregoing and many other changes and substitutions are easily within the ability of one skilled in the art to effect. Each of the following claims is intended to apply to and cover all obvious departures from and substitutes for the herein illustrated mechanical parts and arrangement which fairly fall within the definition of the claims.

I claim:

1. In a load weighing lift truck including weighing apparatus, the combination of, a low-slung wheeled body frame including a pair of laterally spaced side irons, a liftable chassis constructed and arranged to nest telescopically within said frame including a corresponding pair of laterally spaced side irons adapted to be lowered into position to be flanked by said frame irons respectively and extending internally alongside the same, side levers of a weighing apparatus encompassed by said chassis and mounted thereon in a manner to perform independent rocking movement respectively about laterally spaced axes extending longitudinally of the truck internally alongside and close to said chassis side irons respectively thereby to be flanked by both the latter and by said frame side irons, and a platform for receiving the load to be weighed supported jointly by said side levers.

2. In a load weighing lift truck including weighing apparatus, the combination of, an elongated low-slung wheeled body frame including a pair of laterally spaced side irons, a liftable chassis constructed and arranged to nest telescopically within said frame including a corresponding pair of laterally spaced side irons adapted to be lowered into position to be flanked by said frame irons respectively and extending internally alongside the same, a pair of fulcrums spaced longitudinally of the truck mounted on and positioned internally of said chassis side irons and flanked by both the latter and by said frame irons, side levers of a weighing apparatus each resting jointly on a pair of said fulcrums in such manner that said levers perform independent rocking movement respectively about laterally spaced axes extending longitudinally of the truck internally alongside and close to said chassis side irons respectively, and a platform for receiving the load to be weighed supported jointly by said side levers.

3. In a load weighing lift truck, the combination of, a shallow low-lying wheeled truck frame including side irons, a liftable chassis including side irons and adapted to be lowered into nested relation to said frame, a platform structure having downwardly directed flanges spaced inwardly from said side irons of the chassis, a plurality of fulcrums mounted on the inward side of the chassis side irons, levers rockable on said fulcrums, links suspended from said levers, and dog-leg brackets fixed on said flanges of the platform structure projecting downward therefrom and laterally toward said links and respectively seated thereon, the overall vertical height of said fulcrums and levers and links and brackets being flanked by said side irons of both said chassis and said frame when the former is in nested relation to the latter, together with load counterbalancing means connected to sustain said levers in equilibrium.

4. In a load weighing lift truck, the combination of, a low-lying shallow skeletonized wheeled truck frame, a liftable chassis carried by and nestable within said frame, load counterbalancing and weight indicating mechanism supported by said chassis, a load receiving platform, a system of levers beneath said platform forming draft connections between said platform and said mechanism, and a plurality of fulcrums supporting said levers carried by said chassis, said levers and fulcrums occupying and being contained within a range of levels common to the range of levels occupied by said truck frame when said chassis is nested therewithin and one of said fulcrums being carried fixedly by the said chassis near each of four corners of said platform, together with four links jointly bearing the weight of said platform and suspended from points of pivotal bearing on said levers located substantially in a common horizontal plane with said fulcrums and within the said common range of levels.

5. In a load weighing lift truck, the combination defined in claim 4, in which the said system of levers includes a central lever disposed midway and lengthwise of the lift truck, at least two side levers rockably supported on the said fulcrums constructed and arranged to support the said links, additional links coupling said central lever to said side levers, a central fulcrum rockably supporting said central lever, and a cross bar extending from side to side of the said liftable chassis carrying said central fulcrum.

6. In an extremely low-swung load weighing lift truck, the combination of, an elongated low-lying truck carriage including two laterally spaced vertically narrow frame bars and wheels of small diameter between said bars having an axle shaft extending crosswise of said carriage, a liftable chassis on said carriage including two vertically narrow side bars closely flanking said frame bars respectively each located between one of said wheels and one of said frame bars and shaped and disposed to avoid interference with said axle shaft sufficiently to permit said side bars to sink to a position on said carriage very nearly as low as said frame bars, means to elevate said chassis relative to said carriage, load counterbalancing and weight indicating mechanism supported by said chassis, a platform to receive a weighable load, and a system of levers and lever supporting fulcrums beneath said platform forming weighing connections between the latter and said mechanism contained within a range of levels between the top edges of said side bars and the bottom edges of said frame bars and supporting said platform at substantially the level of the top edges of said side bars.

7. In an extremely low-swung load weighing lift truck, the combination of, an elongated low-lying truck carriage including two laterally spaced vertically narrow frame bars and wheels of small diameter between said bars having an axle shaft extending crosswise of said carriage, a liftable chassis on said carriage including two vertically narrow side bars closely flanking said frame bars respectively and shaped and disposed to avoid interference with said axle shaft sufficiently to permit said side bars to sink to a position on said carriage very nearly as low as said frame bars, means to elevate said chassis relative to said carriage, load counterbalancing and weight indicating mechanism supported by said chassis, a platform to receive a weighable load, and a system of levers and lever supporting fulcrums beneath said platform forming weighing connections between the latter and said mechanism contained within a range of levels between the top edges of said side bars and the bottom edges of said frame bars and supporting said platform at substantially the level of the top edges of said side bars.

8. In an extremely low-swung load weighing lift truck, the combination defined in claim 7, together with an upright column supporting the said weight indicating mechanism mounted on the front end of said liftable chassis at a distance from the front end of the said carriage, and a retarding dash-pot including a fluid cylinder elongated in an upright direction between said column and the front end of said carriage, said dash-pot connecting said liftable chassis to said carriage in a manner to absorb the shock of lowering said weight indicating mechanism and chassis with respect to said carriage.

9. In an extremely low-swung load weighing lift truck, the combination defined in claim 7, in which the said weight indicating mechanism includes a graduated pointer dial, together with an upright column supporting the said dial so that the latter can face away from the front end of the said truck carriage mounted on the front end of said liftable chassis at a distance from the front end of said carriage, and a retarding dash-pot including a fluid cylinder elongated in an upright direction between said column and the front end of said carriage, said dash-pot connecting said liftable chassis to said carriage in a manner to absorb the shock of lowering said weight indicating mechanism and chassis with respect to said carriage.

10. In a load weighing lift truck, the combination of, a low-lying shallow skeletonized wheeled truck frame, a liftable chassis carried by and nestable within said frame, load counterbalancing and weight indicating mechanism supported by said chassis, a load receiving platform, a system of levers beneath said platform forming operative connections between said platform and said mechanism including four lever supporting corner fulcrums carried fixedly by said chassis, said levers and fulcrums occupying and being contained within a range of levels common to the range of levels occupied by said truck frame when said chassis is nested therewithin, four links jointly bearing the weight of said platform, at least two side levers presenting pivotal supporting bearings for said links at spaced points normally located substantially in a common horizontal plane with said fulcrums, a central lever, a central fulcrum for said central lever mounted fixedly on said chassis, and coupling links presenting pivotal supporting bearings to said side levers normally located substantially in said common horizontal plane and supported from bearing points on said central lever normally located together with said central fulcrum in a common horizontal plane different from the first said common horizontal plane, both of said horizontal planes being within the said common range of levels.

11. In a load weighing lift truck having a raisable chassis, a weighing platform, and a lever system beneath said platform including a lever having a long bar-like portion, groove and knife edge bearing structure for pivotally supporting said bar-like lever portion upon said chassis in a manner to be rockable on an axis extending lengthwise of said bar-like lever portion, and one or more retaining stops carried by and projecting from said chassis and spaced above said bar-like lever portion sufficiently far therefrom to permit said lever portion operatively to rock and sufficiently near thereto to prevent escape of the knife edge from the groove in said bearing structure.

OSWALD S. CARLISS.